United States Patent
Choi

(10) Patent No.: US 9,524,826 B2
(45) Date of Patent: Dec. 20, 2016

(54) MULTILAYER CERAMIC CAPACITOR AND METHOD OF MANUFACTURING THE SAME

(71) Applicant: SAMSUNG ELECTRO-MECHANICS CO., LTD., Suwon-Si, Gyeonggi-Do (KR)

(72) Inventor: Woo Jin Choi, Suwon-Si (KR)

(73) Assignee: SAMSUNG ELECTRO-MECHANICS CO., LTD., Suwon-Si, Gyeonggi-Do (KR)

(*) Notice: Subject to any disclaimer, the term of this patent is extended or adjusted under 35 U.S.C. 154(b) by 0 days.

(21) Appl. No.: 14/337,017

(22) Filed: Jul. 21, 2014

(65) Prior Publication Data

US 2015/0302989 A1 Oct. 22, 2015

(30) Foreign Application Priority Data

Apr. 21, 2014 (KR) ........................ 10-2014-0047609

(51) Int. Cl.
| | |
|---|---|
| *H01G 2/14* | (2006.01) |
| *H01G 4/248* | (2006.01) |
| *H01G 4/12* | (2006.01) |
| *H01G 4/30* | (2006.01) |
| *H01G 4/012* | (2006.01) |
| *H01G 4/232* | (2006.01) |

(52) U.S. Cl.
CPC ............... *H01G 2/14* (2013.01); *H01G 4/012* (2013.01); *H01G 4/12* (2013.01); *H01G 4/232* (2013.01); *H01G 4/30* (2013.01); *H01G 4/1227* (2013.01)

(58) Field of Classification Search
None
See application file for complete search history.

(56) References Cited

U.S. PATENT DOCUMENTS

| | | | | |
|---|---|---|---|---|
| 8,971,016 | B1* | 3/2015 | Nagamoto | H01G 4/012 361/301.4 |
| 2003/0190462 | A1* | 10/2003 | Nakamura | H01G 4/0085 428/304.4 |
| 2006/0039097 | A1* | 2/2006 | Satou | H01G 4/01 361/303 |
| 2009/0212883 | A1* | 8/2009 | Albrecher | H01C 1/148 333/182 |
| 2010/0097739 | A1* | 4/2010 | Prymak | H01G 4/12 361/301.4 |
| 2010/0220426 | A1* | 9/2010 | Shimizu | H01G 4/30 361/306.3 |
| 2012/0300361 | A1* | 11/2012 | Togashi | H01G 4/30 361/301.4 |

(Continued)

FOREIGN PATENT DOCUMENTS

| | | |
|---|---|---|
| EP | 2023701 A1 | 2/2009 |
| JP | 07-263272 A | 10/1995 |
| KR | 10-2008-0033996 A | 4/2008 |

*Primary Examiner* — Michael Lebentritt
*Assistant Examiner* — Jordan Klein
(74) *Attorney, Agent, or Firm* — McDermott Will & Emery LLP

(57) ABSTRACT

A multilayer ceramic capacitor may include a capacitance forming layer including dielectric layers and internal electrodes disposed on the dielectric layers; a lower cover layer disposed below the capacitance forming layer; an upper cover layer disposed above the capacitance forming layer; and a plurality of crack inducing air gaps disposed in the lower cover layer.

16 Claims, 17 Drawing Sheets

(56) References Cited

U.S. PATENT DOCUMENTS

| | | | |
|---|---|---|---|
| 2013/0100576 A1* | 4/2013 | Seo | H01G 4/30 361/301.4 |
| 2013/0208395 A1* | 8/2013 | Bultitude | H01G 4/30 361/275.1 |
| 2013/0242456 A1* | 9/2013 | Lee | H01G 4/008 361/301.4 |
| 2013/0242457 A1* | 9/2013 | Lee | H01G 4/008 361/301.4 |
| 2013/0250472 A1* | 9/2013 | Lee | H01G 4/12 361/301.4 |
| 2014/0198422 A1* | 7/2014 | Jones | H01G 4/30 361/91.1 |
| 2014/0233150 A1* | 8/2014 | Chung | H01G 4/005 361/301.4 |
| 2015/0084481 A1* | 3/2015 | Mori | H01C 1/148 310/311 |
| 2015/0084487 A1* | 3/2015 | Mori | H01L 41/0472 310/364 |

\* cited by examiner

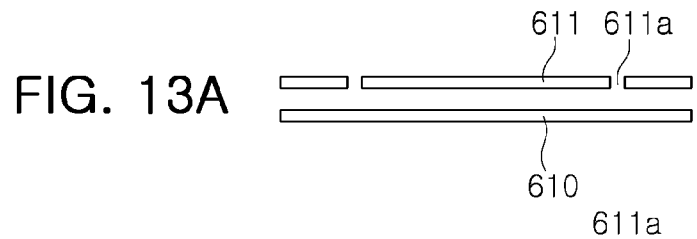
FIG. 13A
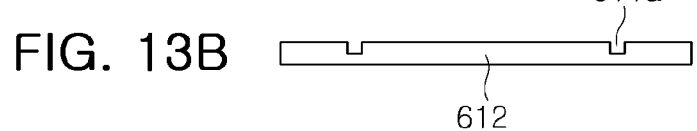
FIG. 13B
FIG. 13C
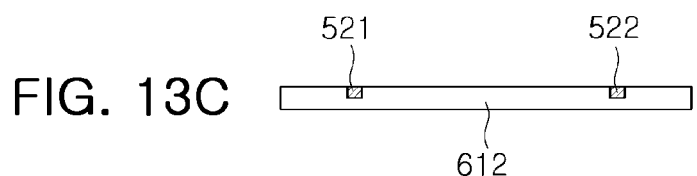
FIG. 13D
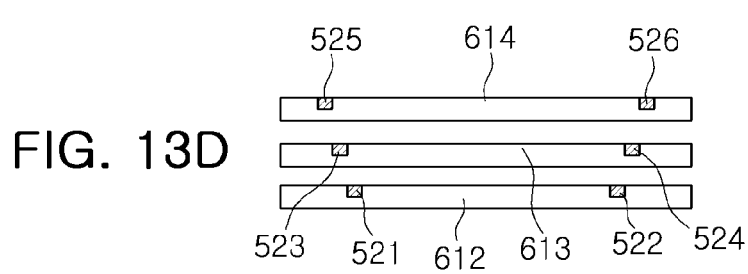
FIG. 13E
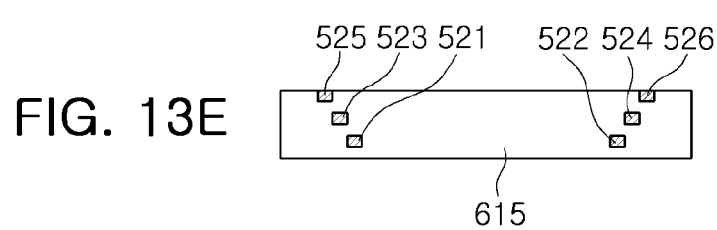
FIG. 13F
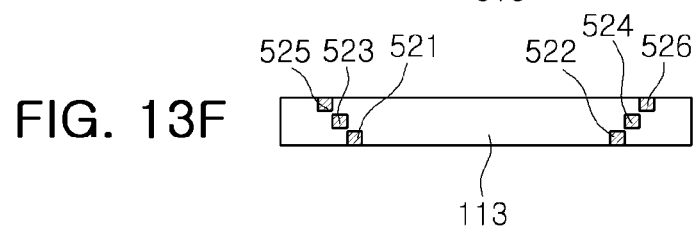
FIG. 13G
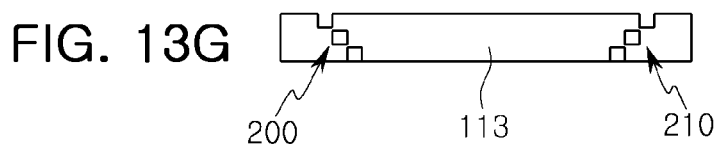

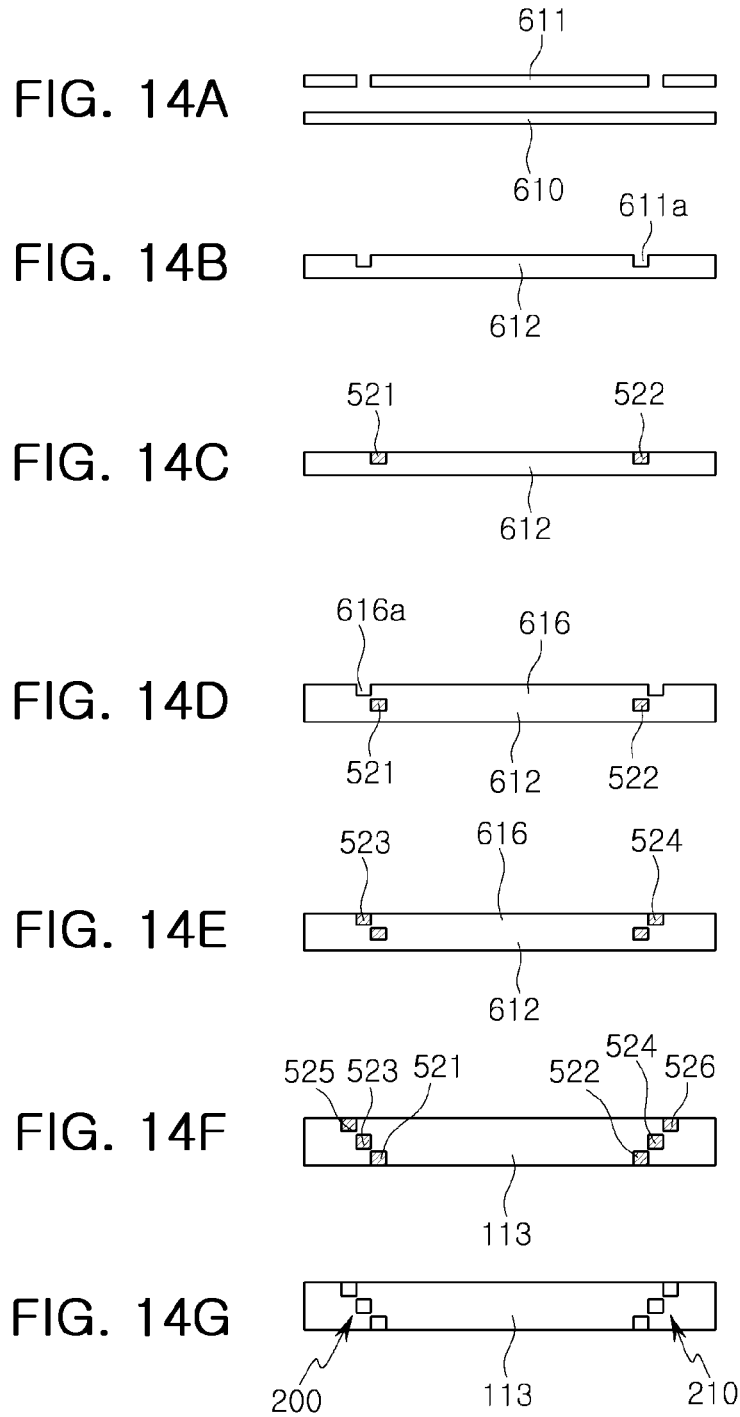

MULTILAYER CERAMIC CAPACITOR AND METHOD OF MANUFACTURING THE SAME

CROSS-REFERENCE TO RELATED APPLICATION

This application claims the benefit of Korean Patent Application No. 10-2014-0047609 filed on Apr. 21, 2014, with the Korean Intellectual Property Office, the disclosure of which is incorporated herein by reference.

BACKGROUND

The present disclosure relates to a multilayer ceramic capacitor and a method of manufacturing the same.

Examples of electronic components using a ceramic material include capacitors, inductors, piezoelectric elements, varistors, thermistors, and the like.

Among these ceramic electronic components, a multilayer ceramic capacitor (MLCC) has advantages such as a small size, high capacitance, and an easy mounting feature.

The multilayer ceramic capacitor is a chip type condenser mounted on a board of several electronic products such as computers, personal digital assistants (PDA), cellular phones, or the like, to perform an important role in charging electricity therein or discharging electricity therefrom and has various sizes and stacked forms depending on the use and the capacity thereof.

Recently, in accordance with miniaturization of electronic products, demand for microminiaturized and ultra-high capacitance multilayer ceramic capacitors has increased to be used in the electronic products.

Therefore, a multilayer ceramic capacitor in which thicknesses of dielectric layers and internal electrodes are decreased to obtain microminiaturized electronic products and a large number of dielectric layers are stacked to obtain ultra-high capacitance electronic products has been manufactured.

In multilayer ceramic capacitors for an electric device, high capacitance and a feature that short circuits do not occur at the time of occurrence of cracks are required.

Particularly, when impacts are applied to the multilayer ceramic capacitor, in a case in which cracks occur in the multilayer ceramic capacitor to cause the occurrence of short circuits in a portion at which cracks occur, a risk that an error will occur in an electronic component using the multilayer ceramic capacitor may be increased.

Therefore, a technology for preventing the occurrence of short circuits even in the case that cracks occur in a multilayer ceramic capacitor has been in demand.

RELATED ART DOCUMENT

Japanese Patent No. 2779896

SUMMARY

Some embodiments of the present disclosure may provide a multilayer ceramic capacitor capable of preventing the occurrence of short circuits even in the case that cracks occur due to impacts applied thereto, and a method of manufacturing the same.

According to some embodiments of the present disclosure, a multilayer ceramic capacitor may include: a capacitance forming layer including dielectric layers and internal electrodes disposed on the dielectric layers; a lower cover layer disposed below the capacitance forming layer; an upper cover layer disposed above the capacitance forming layer; and a plurality of crack inducing air gaps disposed in the lower cover layer.

A thickness of the lower cover layer may be thicker than that of the upper cover layer.

The crack inducing air gaps may be disposed to be adjacent to end surfaces of the lower cover layer, as the crack inducing air gaps are closer to the capacitance forming layer.

The multilayer ceramic capacitor may further include external electrodes covering portions of the lower cover layer and the capacitance forming layer, and electrically connected to the internal electrodes, and the crack inducing air gaps may be disposed to be adjacent to end surfaces of the lower cover layer, as the crack inducing air gaps are closer to the capacitance forming layer from edge portions of the external electrodes formed extendedly.

The crack inducing air gaps may be disposed to induce cracks occurring due to impacts to propagate to end surfaces of the lower cover layers.

The crack inducing air gaps may be formed as a plurality thereof in a linear manner or linearly as a plurality thereof in a disconnected manner in the lower cover layer.

According to some embodiments of the present disclosure, a multilayer ceramic capacitor may include: first dielectric layers on which a first internal electrode is disposed; second dielectric layers on which a second internal electrode is disposed; a ceramic body in which the first and second dielectric layers are alternately stacked; first crack inducing air gaps formed in the first dielectric layers and spaced apart from the first internal electrodes; and second crack inducing air gaps formed in the second dielectric layers and spaced apart from the second internal electrodes.

The first crack inducing air gaps may be disposed to induce cracks occurring due to impacts to propagate in a direction in which the cracks propagate so as to be spaced apart from the first internal electrodes.

The second crack inducing air gaps may be disposed to induce cracks occurring due to impacts to propagate in a direction in which the cracks propagate so as to be spaced apart from the second internal electrodes.

The multilayer ceramic capacitor may further include: a first external electrode disposed on an end surface of the ceramic body and electrically connected to the first internal electrodes; and a second external electrode disposed on a surface of the ceramic body opposing the surface on which the first external electrode is disposed, and electrically connected to the second internal electrodes, and the first crack inducing air gaps may be disposed to induce cracks propagating from the second external electrode to propagate in a direction in which the cracks propagate so as to be spaced apart from the first internal electrodes.

The multilayer ceramic capacitor may further include: a first external electrode disposed on an end surface of the ceramic body and electrically connected to the first internal electrodes; and a second external electrode disposed on a surface of the ceramic body opposing the surface on which the first external electrode is disposed, and electrically connected to the second internal electrodes, and the second crack inducing air gaps may be disposed to induce cracks propagating from the first external electrode in a direction in which the cracks propagate so as to be spaced apart from the second internal electrodes.

The first crack inducing air gaps may be formed as a plurality thereof in a linear manner or linearly as a plurality thereof in a disconnected manner in the first dielectric layers, and the second crack inducing air gaps may be provided as a plurality thereof in a linear manner or linearly as a plurality thereof in a disconnected manner in the second dielectric layers.

According to some embodiments of the present disclosure, a multilayer ceramic capacitor may include: first dielectric layers on which first and second internal electrodes are disposed; second dielectric layers on which a float electrode is formed, the float electrodes being overlapped with portions of the first and second internal electrodes, respectively; and crack inducing air gaps disposed in the first dielectric layers and spaced apart from the first and second internal electrodes.

The crack inducing air gaps may be disposed to induce cracks passing through the float electrodes to be spaced apart from the first and second internal electrodes.

The crack inducing air gaps may be disposed as a plurality thereof in a linear manner or linearly as a plurality thereof in a disconnected manner in the first dielectric layers.

According to some embodiments of the present disclosure, a method of manufacturing a multilayer ceramic capacitor may include: preparing dielectric layers; forming binders on the dielectric layers to form crack inducing air gaps; stacking and compressing the dielectric layers to prepare a ceramic multilayer body; and heat-treating the ceramic multilayer body to remove the binders and thus form the crack inducing air gaps.

In the forming of the binders, an interval between the binders formed in an upper portion of the ceramic multilayer body may be wider than an interval between the binders formed in a lower portion of the ceramic multilayer body.

In the forming of the binders, the binders may be provided as single gaps, as quadrangular, disconnected gaps, or as circular, disconnected gaps.

According to some embodiments of the present disclosure, a method of manufacturing a multilayer ceramic capacitor may include: preparing a first dielectric layer and a second dielectric layer having grooves; stacking the second dielectric layer on the first dielectric layer to form a plurality of lower cover layers; forming binders in the grooves to form crack inducing air gaps; stacking and compressing the plurality of lower cover layers to prepare a ceramic multilayer body; and heat-treating the ceramic multilayer body to remove the binders and thus form the crack inducing air gaps.

In the preparing of the second dielectric layer, an interval between the grooves formed in an upper portion of the ceramic multilayer body may be wider than an interval between the grooves formed in a lower portion of the ceramic multilayer body.

According to some embodiments of the present disclosure, a method of manufacturing a multilayer ceramic capacitor may include: preparing a first dielectric layer and a second dielectric layer having first grooves; stacking the second dielectric layer on the first dielectric layer; forming first binders in the first grooves to form crack inducing air gaps; forming a third dielectric layer on the second dielectric layer, the third dielectric layer having second grooves; forming second binders in the second grooves to form the crack inducing air gaps; compressing the stacked first, second, and third dielectric layers to prepare a ceramic multilayer body; and heat-treating the ceramic multilayer body to remove the binders and thus form the crack inducing air gaps.

An interval between the second grooves may be wider than an interval between the first grooves.

According to some embodiments of the present disclosure, a method of manufacturing a multilayer ceramic capacitor may include: preparing a first dielectric layer and a second dielectric layer having grooves; stacking the second dielectric layer on the first dielectric layer to form a plurality of lower cover layers; and stacking and compressing the plurality of lower cover layers to prepare a ceramic multilayer body.

In the preparing of the second dielectric layer having the grooves, an interval between the grooves formed in an upper portion of the ceramic multilayer body may be wider than an interval between the grooves formed in a lower portion of the ceramic multilayer body.

According to some embodiments of the present disclosure, a method of manufacturing a multilayer ceramic capacitor may include: preparing a plurality of dielectric layers; forming grooves in the plurality of dielectric layers to form crack inducing air gaps; and stacking and compressing the plurality of dielectric layers having the grooves to prepare a ceramic multilayer body.

In the forming of the grooves, an interval between the grooves formed in an upper portion of the ceramic multilayer body may be wider than an interval between the grooves formed in a lower portion of the ceramic multilayer body.

BRIEF DESCRIPTION OF DRAWINGS

The above and other aspects, features and other advantages of the present disclosure will be more clearly understood from the following detailed description taken in conjunction with the accompanying drawings, in which:

FIGS. 13A through 15E are views schematically illustrating various methods of forming crack inducing air gaps in a method of manufacturing a multilayer ceramic capacitor according to an exemplary embodiment of the present disclosure;

Figures 17A, 17B, 17C, 17D, 17E:
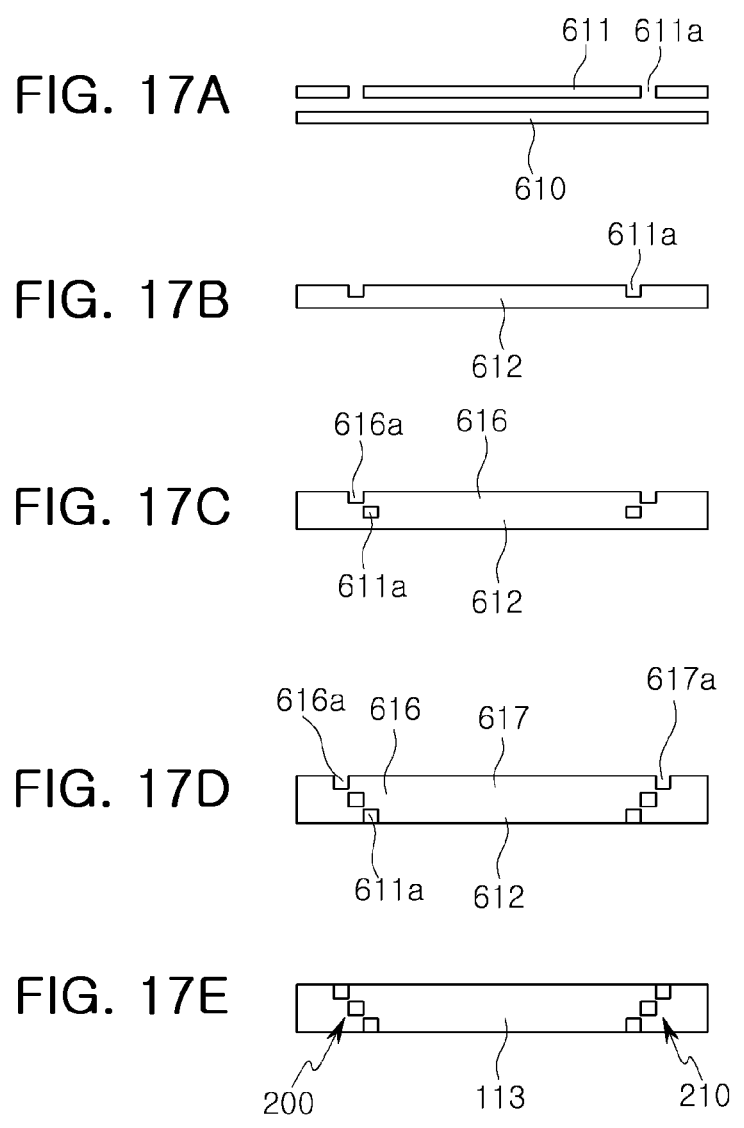

FIGS. 17A through 17E are views schematically illustrating another method of forming crack inducing air gaps in a method of manufacturing a multilayer ceramic capacitor according to an exemplary embodiment of the present disclosure.

DETAILED DESCRIPTION

Figure 1:
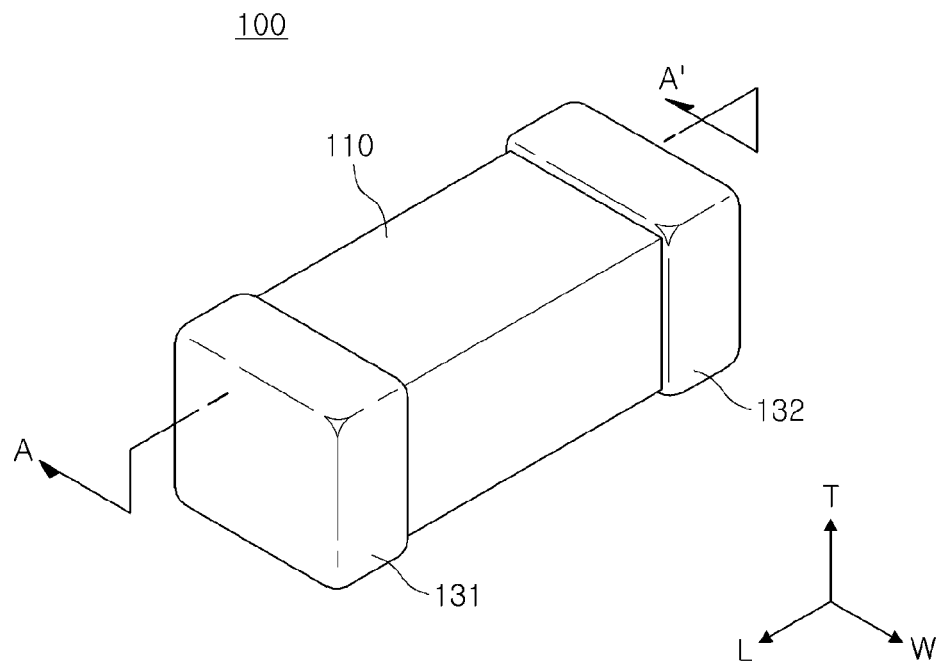
FIG. 1 is a schematic perspective view of a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, terms with respect to directions will be defined before describing the present disclosure. In FIG. 1, L, W, and T refer to a length direction, a width direction, and a thickness direction, respectively.

Figure 2:
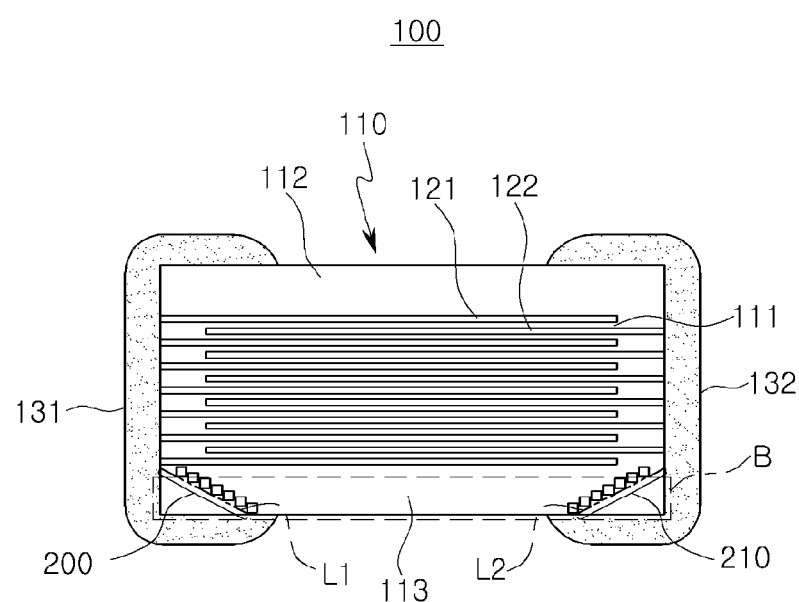
FIG. 2 is a schematic cross-sectional view of the multilayer ceramic capacitor according to an exemplary embodiment of the present disclosure taken along line A-A' of FIG. 1.

FIG. 1 is a schematic perspective view of a multilayer ceramic capacitor according to an exemplary embodiment of the present disclosure, and FIG. 2 is a schematic cross-sectional view of the multilayer ceramic capacitor according to an exemplary embodiment of the present disclosure taken along line A-A' of FIG. 1.

Referring to FIGS. 1 and 2, a multilayer ceramic capacitor 100 according to an exemplary embodiment of the present disclosure may include a capacitance forming layer 111, an upper cover layer 112 formed above the capacitance forming layer 111, and a lower cover layer 113 formed below the capacitance forming layer 111.

The capacitance forming layer 111, the upper cover layer 112, and the lower cover layer 113 may be stacked, compressed, and sintered to form a ceramic body 110.

The capacitance forming layer 111 may be formed by stacking dielectric layers 122 on which internal electrodes 121 are formed.

The internal electrodes 121 may be exposed to end surfaces of the ceramic body 110.

A first external electrode 131 may be formed on one end surface of the ceramic body 110, and a second external electrode 132 may be formed on a surface of the ceramic body 110 opposing the surface of the ceramic body 110 on which the first external electrode 131 is formed.

Some of the internal electrodes 121 may be electrically connected to the first external electrode 131, and the others thereof may be electrically connected to the second external electrode 132.

The internal electrodes 121 electrically connected to the first and second external electrodes 131 and 132, respectively, may be alternately stacked to form capacitance of the multilayer ceramic capacitor.

Referring to FIG. 2, crack inducing air gaps 200 and 210 may be disposed along lines L1 and L2.

In the case in which the crack inducing air gaps 200 and 210 are not present, when cracks occur due to impacts applied to the multilayer ceramic capacitor 100, cracks may be propagated to the internal electrodes 122.

In the case in which the cracks are propagated to the internal electrodes 122, short circuits may occur due to conductive foreign materials, or the like. Therefore, reliability of the multilayer ceramic capacitor 100 may be decreased.

However, in the case in which the crack inducing air gaps 200 and 210 are present, they may induce the cracks in a certain direction so as to prevent the cracks from propagating to an inner portion of the capacitance forming layer 110.

For example, the cracks may propagate along the lines L1 and L2 of FIG. 2 to prevent the internal electrodes 122 having different polarities from being short-circuited.

Referring to FIG. 2, the first and second external electrodes 131 and 132 may cover portions of the upper cover layer 112, sides of the capacitance forming layer 111, and portions of the lower cover layer 113.

For example, the first and second external electrodes 131 and 132 may be extended outwardly from the capacitance forming layer 111 to the portions of the upper and lower cover layers 112 and 113.

Portions of the first and second external electrodes 131 and 132 covering the portions of the upper and lower cover layers 112 and 113 may be defined as, for example, band portions.

In the case in which cracks occur due to impacts applied to the multilayer ceramic capacitor 100, stress may be concentrated on end portions of the extendedly formed external electrodes 131 and 132, such that the possibility that cracks may occur in the end portions may be increased.

Therefore, as shown in FIG. 2, the crack inducing air gaps 200 and 210 may be disposed to be adjacent to end surfaces of the lower cover layer 113 from the edge portions of the external electrodes 131 and 132 extendedly formed on the lower cover layer, along lines L1 and L2, respectively, thereby inducing cracks occurring due to impacts to propagate in a direction along the end surfaces of the lower cover layer.

Figure 3A:
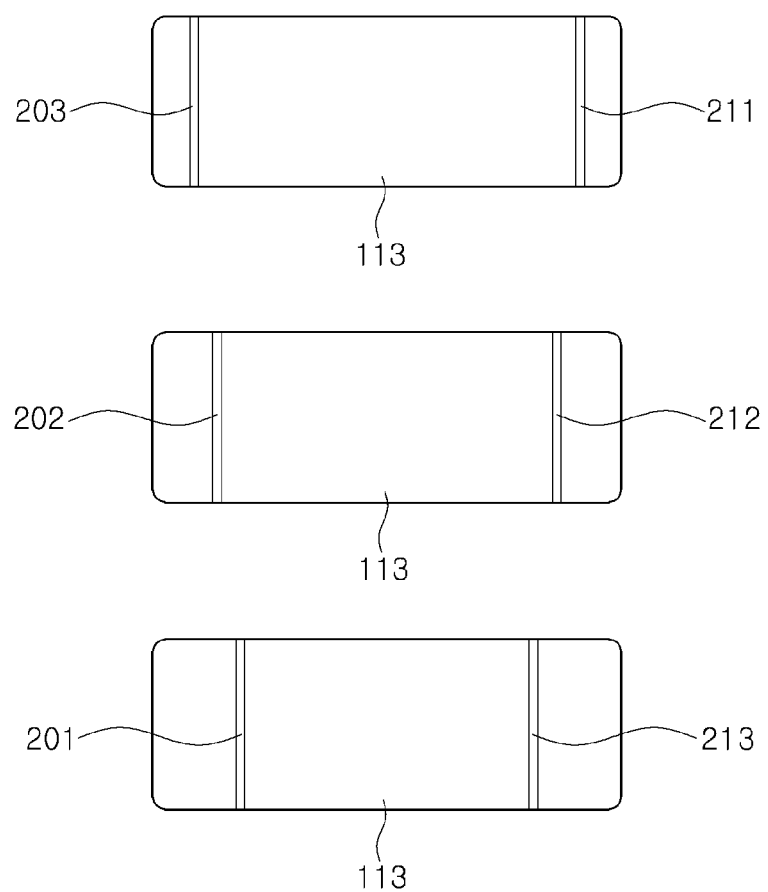
FIGS. 3A and 3B are schematic plan views of several examples of dielectric layers stacked in region B of FIG. 2.
Figure 3B:
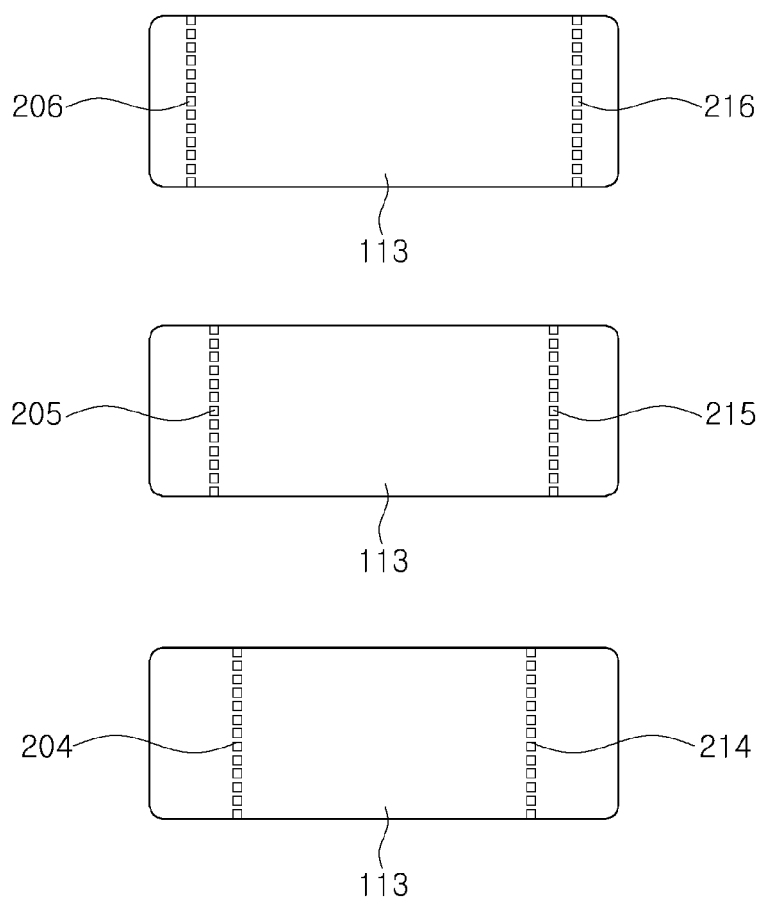

FIGS. 3A and 3B are schematic plan views of several examples of dielectric layers stacked in region B of FIG. 2.

Referring to FIG. 3A, one or more crack inducing air gaps 201 to 203 and 211 to 213 may be formed in the lower cover layer 113.

The lower cover layer 113 may be formed by stacking a plurality of dielectric layers shown in FIG. 3A.

The crack inducing air gaps 201 to 203 and 211 to 213 may be formed in the respective dielectric layers before the dielectric layers are stacked.

Referring to FIG. 3A, it may be appreciated that the crack inducing air gaps 201 to 203 and 211 to 213 formed in the respective dielectric layers may be more adjacent to an end surface thereof in an upper dielectric layer than in a lower dielectric layer.

Directions in which the cracks propagate may be induced by adjusting positions of the crack inducing air gaps 201 to 203 and 211 to 213.

The crack inducing air gaps 201 to 203 and 211 to 213 may be formed as a plurality thereof in a linear manner as illustrated in FIG. 3A.

With reference to FIG. 3B, the crack inducing air gaps 201 to 203 and 211 to 213 may be formed linearly as a plurality thereof in a disconnected manner in the lower cover layer 113.

Whether the crack inducing air gaps 201 to 203 and 211 to 213 are formed as a plurality thereof in a linear manner or formed linearly as a plurality thereof in a disconnected manner may be determined depending on an environment in which the multilayer ceramic capacitor is used.

Figure 4:
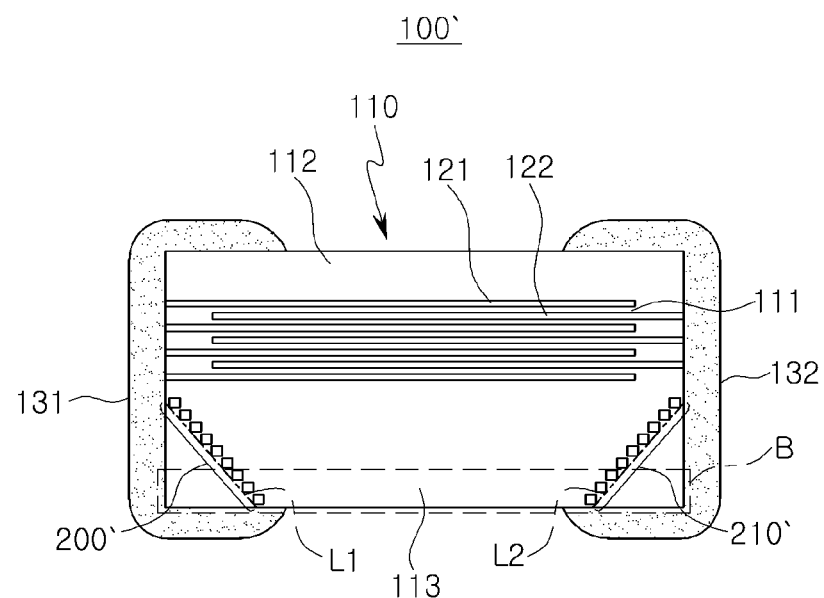
FIG. 4 is a schematic cross-sectional view of a multilayer ceramic capacitor according to another exemplary embodiment of the present disclosure.

Referring to FIG. 4, in a multilayer ceramic capacitor 100', a thickness of the lower cover layer 113 may be thicker than that of the upper cover layer 112.

In the case in which the lower cover layer 113 is thicker than that of the upper cover layer 112, acoustic noise of the multilayer ceramic capacitor 100' may be decreased.

The lower cover layer 113 may include crack inducing air gaps 200' and 210' formed therein.

The crack inducing air gaps 200' and 210' may induce a direction in which cracks propagate in the case in which cracks occur due to impacts applied to the multilayer ceramic capacitor 100'.

For example, the crack inducing air gaps 200' and 210' may be disposed to be adjacent to end surfaces of the lower cover layer 113, respectively, as they are adjacent to the capacitance forming layer 111.

Meanwhile, in the case in which the lower cover layer 113 is thicker than a thickness of the upper cover layer 112, angles of the lines L1 and L2 with respect to a lower surface of the ceramic body may be greater than those of the lines L1 and L2 in the exemplary embodiment of the present disclosure illustrated in FIG. 1, such that a crack inducing effect of the crack inducing air gaps may be improved.

Figure 5:
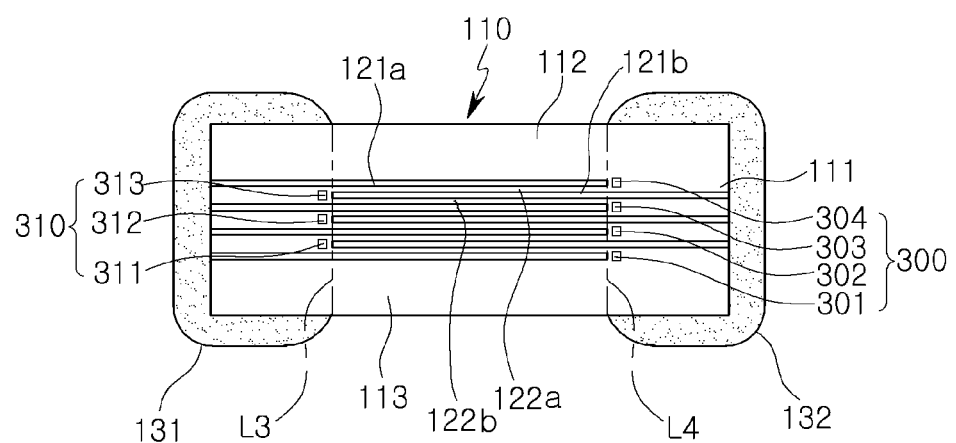
FIG. 5 is a schematic cross-sectional view of a multilayer ceramic capacitor according to another exemplary embodiment of the present disclosure.

FIG. 5 is a schematic cross-sectional view of a multilayer ceramic capacitor according to another exemplary embodiment of the present disclosure.

The multilayer ceramic capacitor according to another exemplary embodiment of the present disclosure will be described with reference to FIG. 5. The multilayer ceramic capacitor according to another exemplary embodiment of the present disclosure may include first dielectric layers 122a having first internal electrodes 121a disposed thereon; second dielectric layers 122b having second internal electrodes 121b disposed thereon; a ceramic body 110 having the first and second dielectric layers 122a and 122b alternately stacked therein; first crack inducing air gaps 301 to 304 formed in the first dielectric layers 122a and spaced apart from the first internal electrodes 121a; and second crack inducing air gaps 311 to 313 formed in the second dielectric layers 122b and spaced apart from the second internal electrodes 121b.

Since the first crack inducing air gaps 301 to 304 are spaced apart from the first internal electrodes 121a, even in the case in which cracks pass through the second internal electrodes 121b, the cracks do not contact the first internal electrodes 121a.

Similarly, since the second crack inducing air gaps 311 to 313 are spaced apart from the second internal electrodes 121b, even in the case in which cracks pass through the first internal electrodes 121a, the cracks do not contact the second internal electrodes 121b.

For example, the first crack inducing air gaps 301 to 304 may induce cracks occurring due to impacts in a direction in which the cracks may propagate so as to be spaced apart from the first internal electrodes 121a, and the second crack inducing air gaps 311 to 313 may induce cracks due to impacts in a direction in which the cracks may propagate so as to be spaced apart from the second internal electrodes 121b.

Therefore, even in the case in which cracks occur, the occurrence of short circuits between the first and second internal electrodes 121a and 121b may be prevented to improve reliability of the multilayer ceramic capacitor.

Referring to FIG. 5, the multilayer ceramic capacitor according to another exemplary embodiment of the present disclosure may further include a first external electrode 131 disposed on an end surface of the ceramic body 110 and electrically connected to the first internal electrodes 121a and a second external electrode 132 disposed on a surface of the ceramic body 110 opposing the surface thereof on which the first external electrode 131 is disposed and electrically connected to the second internal electrodes 121b.

In the case in which the external electrodes 131 and 132 are formed, they may extend to surfaces of the ceramic body adjacent to the end surfaces of the ceramic body 110 as well as being formed on the end surfaces thereof. The extended portions of the external electrodes 131 and 132 may be defined as band portions.

In the case in which the band portions are formed, when impacts are applied to the multilayer ceramic capacitor, cracks may mainly occur in distal ends (inner edges) of the band portions.

For example, when the impacts are applied to the multilayer ceramic capacitor, cracks may occur in the distal end of the extended portion of the first external electrode 131 and then propagate further. When cracks propagate to a central portion of the ceramic body 110, a possibility that the first external electrode 131 and the second internal electrode 121b will be short-circuited may be increased.

Therefore, as shown in FIG. 5, the second crack inducing air gaps 311 to 313 may be formed so that cracks occurring in the distal end (inner edge) of the extended portion of the first external electrode 131 propagate to the outside of line L3 based on the central portion of the ceramic body 110.

Similarly, the first crack inducing air gaps 301 to 304 may be formed so that cracks occurring in the distal end of the extended portion of the second external electrode 132 propagate to the outside of line L4 based on the central portion of the ceramic body 110.

The first crack inducing air gaps 301 and 304 or the second crack inducing air gaps 311 to 313 may induce cracks in a direction in which the occurrence of short circuits in the multilayer ceramic capacitor is prevented, thereby improving reliability of the multilayer ceramic capacitor.

Figure 6A:
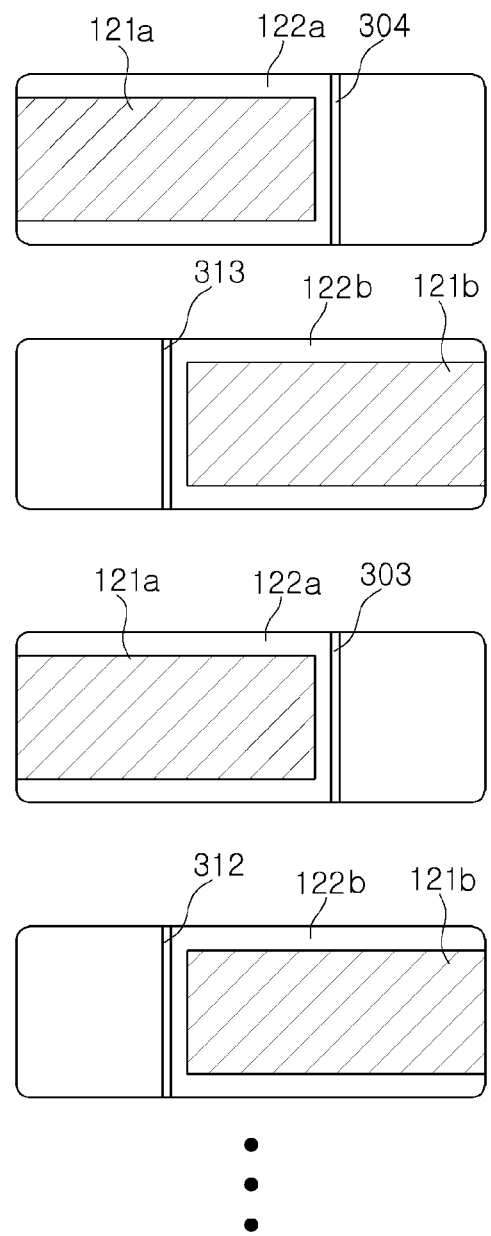
FIGS. 6A and 6B are schematic plan views of several examples of dielectric layers on which internal electrodes of FIG. 5 are formed.
Figure 6B:
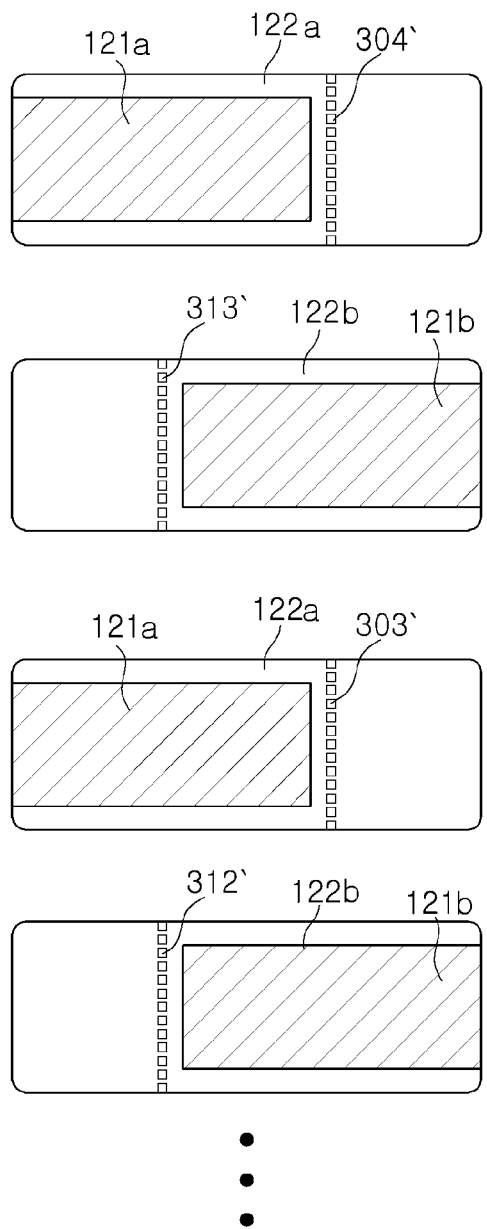

FIGS. 6A and 6B are schematic plan views of several examples of dielectric layers on which internal electrodes of FIG. 5 are formed.

FIGS. 6A and 6B illustrate the dielectric layers 122a and 122b of the capacitance forming layer 111 in a stacking sequence.

Referring to FIGS. 6A and 6B, it may be appreciated that the first dielectric layers 122a on which the first internal electrode 121a is formed and the second dielectric layers 122b on which the second internal electrode 121b is formed are alternately arranged.

Referring to FIG. 6A, it may be appreciated that first crack inducing air gaps 303 and 304 and second crack inducing air gaps 312 and 313 are spaced apart from the first internal electrodes 121a and the second internal electrodes 121b, respectively, and are formed as a plurality thereof in a linear manner.

Referring to FIG. 6B, it may be appreciated that first crack inducing air gaps 303' and 304' and second crack inducing air gaps 312' and 313' are spaced apart from the first internal electrodes 121a and the second internal electrodes 121b, respectively, and are formed linearly as a plurality thereof in a disconnected manner.

Whether the crack inducing air gaps are formed as a plurality thereof in a linear manner or formed linearly as a plurality thereof in a disconnected manner may be determined depending on an environment in which the multilayer ceramic capacitor is used.

Figure 7:
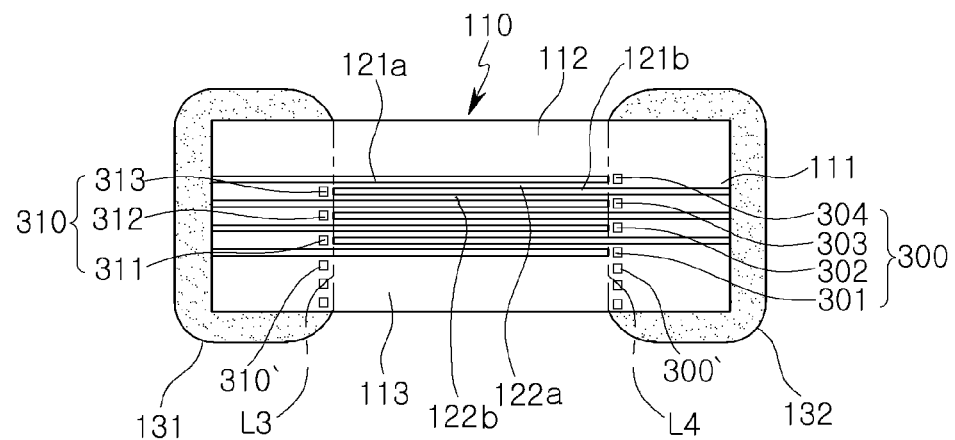
FIG. 7 is a schematic cross-sectional view of a multilayer ceramic capacitor according to another exemplary embodiment of the present disclosure.

Referring to FIG. 7, first and second crack inducing air gaps 310' and 300' may be extended outwardly from the capacitance forming layer 111 to a bottom surface of the ceramic body 110 through the lower cover layer 113 along lines L3 and L4, respectively, so that cracks occurring in distal ends of extended portions of the first and second external electrodes 131 and 132 are induced to the first and second crack inducing air gaps 310 and 300 of the capacitance forming layer 111, respectively. Here, the first and second crack inducing air gaps 310, 300, 310' and 300' may be formed as a plurality thereof in a linear manner in a vertical direction.

Figure 8:
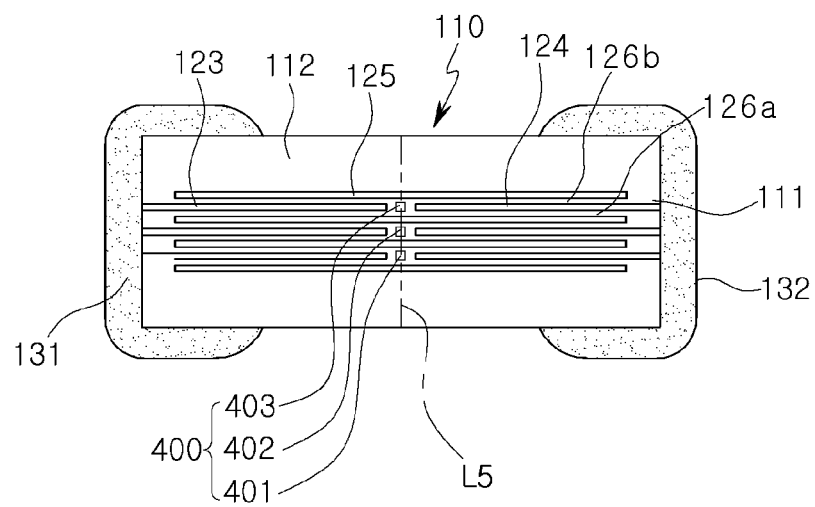
FIG. 8 is a schematic cross-sectional view of a multilayer ceramic capacitor according to another exemplary embodiment of the present disclosure.

FIG. 8 is a schematic cross-sectional view of a multilayer ceramic capacitor according to another exemplary embodiment of the present disclosure.

Referring to FIG. 8, the multilayer ceramic capacitor according to another exemplary embodiment of the present disclosure may include first dielectric layers 126a on which first and second internal electrodes 123 and 124 are disposed; second dielectric layers 126b on which float electrodes 125 are formed, the float electrodes 125 being overlapped with portions of the first and second internal electrodes 123 and 124, respectively; and crack inducing air gaps 400 disposed in the first dielectric layers 126a and spaced apart from the first and second internal electrodes 123 and 124.

Since the multilayer ceramic capacitor according to another exemplary embodiment of the present disclosure may include the float electrodes 125, high voltage characteristics and low capacitance characteristics may be provided.

Since the crack inducing air gaps 400 are spaced apart from the first and second internal electrodes 123 and 124, cracks may be induced in a certain direction so that cracks do not propagate to the first and second internal electrodes 123 and 124 when impacts are applied to the multilayer ceramic capacitor.

Therefore, the occurrence of short circuits in the multilayer ceramic capacitor may be prevented, thereby improving reliability of the multilayer ceramic capacitor.

Figure 9A:
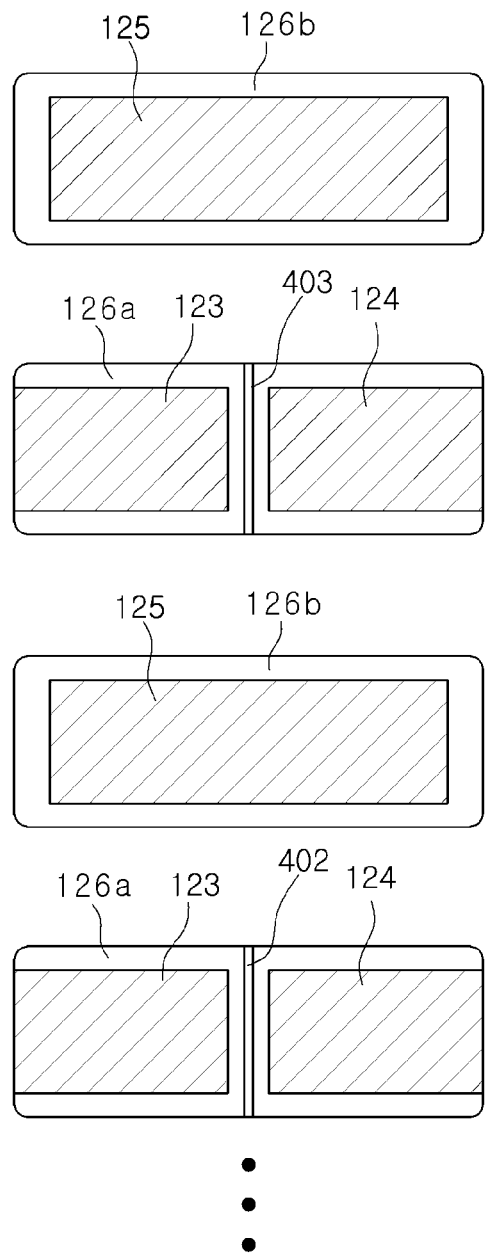
FIGS. 9A and 9B are schematic plan views of several examples of dielectric layers on which internal electrodes of FIG. 8 are formed.
Figure 9B:
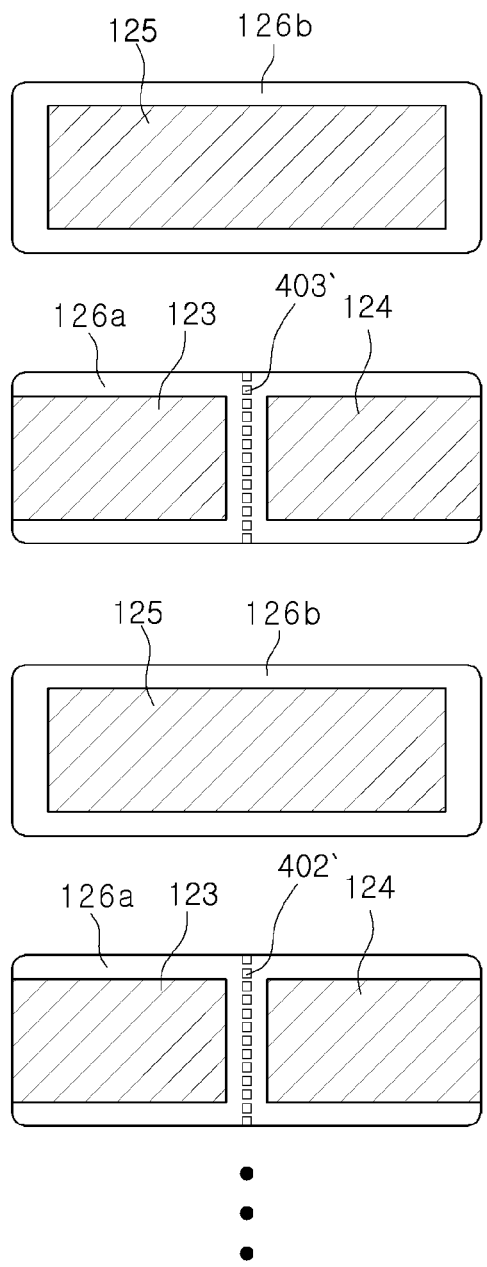

FIGS. 9A and 9B are schematic plan views of several examples of the respective dielectric layers on which internal electrodes and float electrodes of FIG. 8 are formed.

Referring to FIGS. 9A and 9B, it may be appreciated that crack inducing air gaps 401 to 403 are not formed in the second dielectric layers 126b on which the float electrodes 125 are formed, but are only formed in the first dielectric layers 126a.

The crack inducing air gaps 401 to 403 may be spaced apart from the first and second internal electrodes 123 and 124 by a predetermined interval to induce cracks in a direction in which the cracks do not meet the first and second internal electrodes 123 and 124.

As illustrated in FIG. 9A, crack inducing air gaps 402 and 403 may be formed linearly, and as illustrated in FIG. 9B, crack inducing air gaps 402' and 403' may be formed linearly as a plurality thereof in a disconnected manner.

Whether the crack inducing air gaps are formed as a plurality thereof in a linear manner or formed linearly as a plurality thereof in a disconnected manner may be determined depending on an environment in which the multilayer ceramic capacitor is used.

Figure 10:
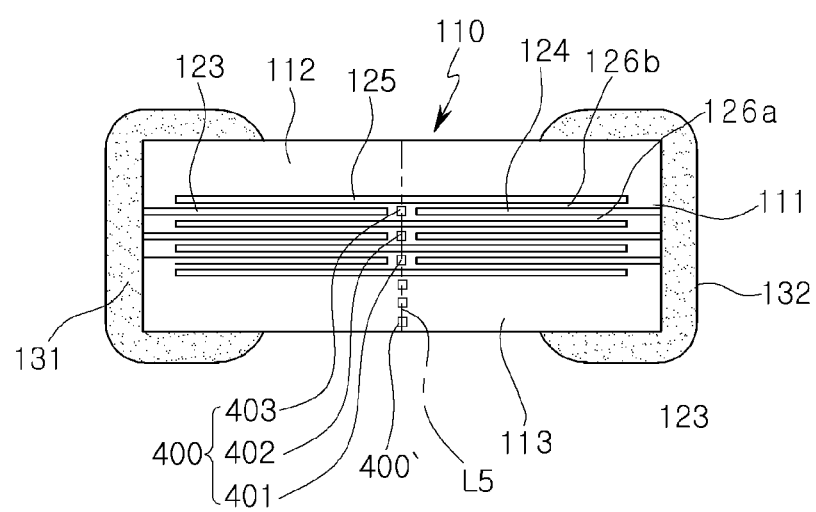
FIG. 10 is a schematic cross-sectional view of a multilayer ceramic capacitor according to another exemplary embodiment of the present disclosure.

Referring to FIG. 10, crack inducing air gaps 400' may be extended outwardly from the capacitance forming layer 111 to a bottom surface of the ceramic body 110 through the lower cover layer 113 along line L5 so that cracks occurring in the bottom surface of the ceramic body 110 are induced to the crack inducing air gaps 400 of the capacitance forming layer 111. Here, the crack inducing air gaps 400 and 400' may be formed in a linear manner in the vertical direction.

FIGS. 11A through 11E are views schematically illustrating a method of forming crack inducing air gaps in a method of manufacturing a multilayer ceramic capacitor according to an exemplary embodiment of the present disclosure.

The method of forming crack inducing air gaps in the lower cover layer 113 will be described with reference to FIGS. 11A through 11E.

Figure 11A:
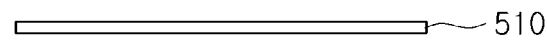
FIGS. 11A through 11E are views schematically illustrating a method of forming crack inducing air gaps in a method of manufacturing a multilayer ceramic capacitor according to an exemplary embodiment of the present disclosure.

First, a dielectric layer 510 may be prepared (See FIG. 11A).

The dielectric layer 510 may contain a high-k ceramic material, for example, a barium titanate ($BaTiO_3$) based ceramic powder, or the like. However, the present disclosure is not limited thereto as long as a sufficient capacitance may be obtained.

Further, in addition to the ceramic powder, various kinds of ceramic additives, organic solvents, plasticizers, binding agents, dispersing agents, and the like, such as transition metal oxide or carbide, a rare earth element, magnesium (Mg), aluminum (Al), or the like, may be added to the dielectric layer 510, as necessary.

Figure 11B:

Then, binders 521 and 522 for forming crack inducing air gaps may be formed on the dielectric layer 510 (See FIG. 11B).

As the binders 521 and 522, a material capable of being removed through a plasticizing process or a heat treatment process may be used, for example, an organic binder may be used, but is not limited thereto.

Figure 11C:
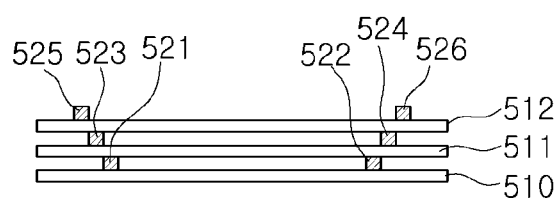

Referring to FIG. 11C, after the binders 521 and 522 are formed, a dielectric layer 511 may be formed on the binders 521 and 522.

Binders 523 and 524 may be formed on the dielectric layer 511. Here, an interval between the binders 523 and 534 may be slightly wider than an interval between the binders 521 and 522 positioned below the binders 523 and 524.

After the binders 523 and 524 are formed, a dielectric layer 512 may be formed, and new binders 525 and 526 may be formed.

The above-mentioned process may be repeated until the dielectric layers are stacked to have a height appropriate therefor.

Figure 11D:
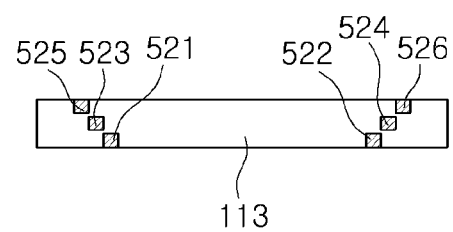
Figure 11E:
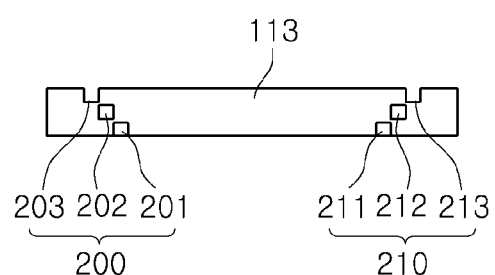

The stacked dielectric layers may be compressed to prepare a ceramic multilayer body (FIG. 11D).

The ceramic multilayer body may be plasticized or heat-treated to remove (de-bind) the binders formed therein, thereby forming crack inducing air gaps 200 and 210.

Figure 12A:
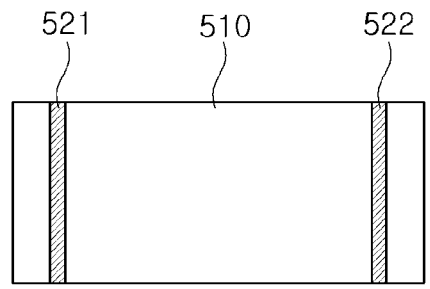
FIGS. 12A through 12C are plan views schematically illustrating various shapes of binders in the method of manufacturing a multilayer ceramic capacitor of FIGS. 11A through 11E.
Figure 12B:
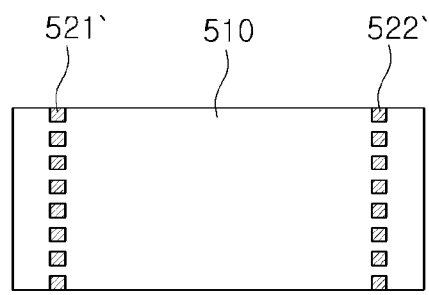
Figure 12C:
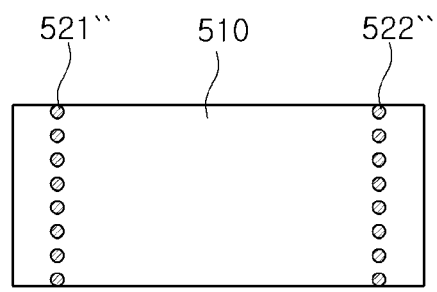

FIGS. 12A through 12C are plan views schematically illustrating variously shaped binders in the method of manufacturing a multilayer ceramic capacitor of FIGS. 11A through 11E.

Referring to FIGS. 12A through 12C, binders may be formed as single gaps (See FIG. 12A), as quadrangular, disconnected gaps (See FIG. 12B), or as circular, disconnected gaps (See FIG. 12C).

Since the shapes of the crack inducing air gaps are determined depending on shapes of the binders, the shapes of the binders may be appropriately changed as necessary.

FIGS. 13A through 14G are views schematically illustrating various methods of forming crack inducing air gaps in a method of manufacturing a multilayer ceramic capacitor according to an exemplary embodiment of the present disclosure.

Referring to FIGS. 13A through 13G, a method of forming crack inducing air gaps in a method of manufacturing a multilayer ceramic capacitor may include preparing a first dielectric layer 610 and a second dielectric layer 611 having grooves 611a formed therein (See FIG. 13A); stacking the second dielectric layer 611 on the first dielectric layer 610 to form a plurality of lower cover layers 612 (See FIG. 13B); forming binders 521 and 522 in the grooves 611a in order to form the crack inducing air gaps (See FIG. 13C); stacking and compressing the plurality of lower cover layers 612 to prepare a ceramic multilayer body 615 (See FIGS. 13D through 13F); and heat-treating the ceramic multilayer body 615 to remove the binders, thereby forming the crack inducing air gaps (See FIG. 13G).

In the preparing of the second dielectric layer 611 having the grooves 611a formed therein, an interval between the grooves formed in an upper portion of the ceramic multilayer body may be wider than an interval between the grooves formed in a lower portion of the ceramic multilayer body in order to induce cracks to propagate to end surfaces of the ceramic multilayer body.

Referring to FIGS. 14A through 14G, a method of forming crack inducing air gaps in a method of manufacturing a multilayer ceramic capacitor may include preparing a first dielectric layer 610 and a second dielectric layer 611 having first grooves 611a formed therein (See FIG. 14A); stacking the second dielectric layer 611 on the first dielectric layer 610 (See FIG. 14B); forming first binders 521 and 522 in the first grooves 611a in order to form the crack inducing air gaps (See FIG. 14C); forming a third dielectric layer 616 on the second dielectric layer 611, the third dielectric layer 616 having second grooves 616a formed therein (See FIG. 14D); forming second binders 523 and 524 in the second grooves 616a in order to form the crack inducing air gaps (See FIG. 14E); compressing the first, second, and third dielectric layers 610, 611, and 616 stacked to prepare a ceramic multilayer body (See FIG. 14F); and heat-treating the ceramic multilayer body to remove the binders, thereby forming the crack inducing air gaps (See FIG. 14G).

An interval between the second grooves 616a may be wider than an interval between the first grooves 611a in order to induce cracks to propagate to end surfaces of the ceramic multilayer body.

Figure 15A:
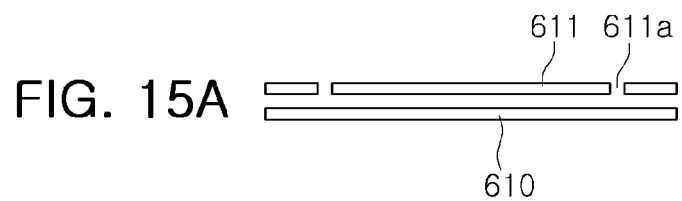
Figure 15B:
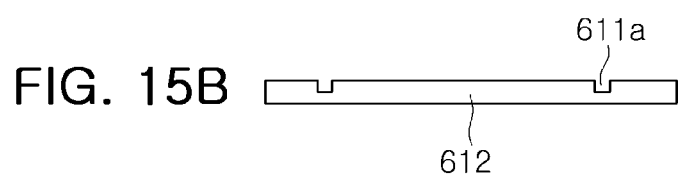
Figure 15C:
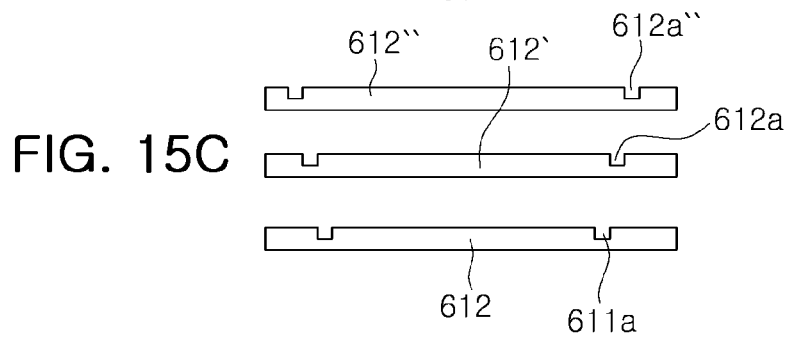
Figure 15D:
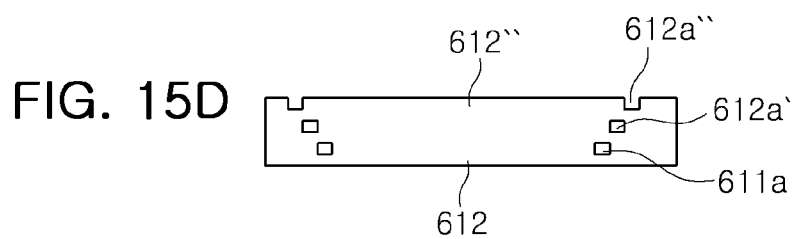
Figure 15E:
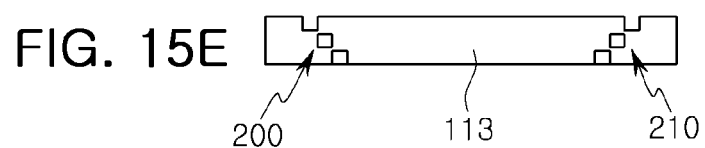

Referring to FIGS. 15A through 15E, a method of forming crack inducing air gaps in a method of manufacturing a multilayer ceramic capacitor may include preparing a first dielectric layer 610 and a second dielectric layer 611 having grooves 611a formed therein (See FIG. 15A); stacking the second dielectric layer 611 on the first dielectric layer 610 to form a plurality of lower cover layers 612 (See FIGS. 15B and 15C); and stacking and compressing the plurality of lower cover layers 612 to prepare a ceramic multilayer body (See FIGS. 15D and 15E).

In the preparing of the second dielectric layer 611 having the grooves 611a formed therein, an interval between the grooves formed in an upper portion of the ceramic multilayer body may be wider than an interval between the grooves formed in a lower portion of the ceramic multilayer body in order to induce cracks to propagate to end surfaces of the ceramic multilayer body.

Figure 16A:
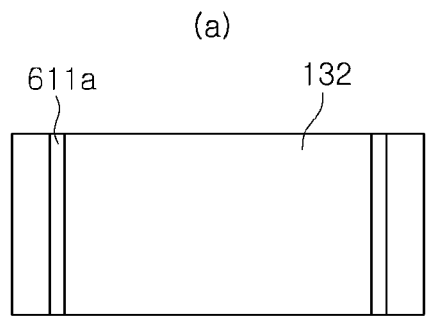
FIGS. 16A through 16C are plan views schematically illustrating various cross-sectional shapes of grooves in the methods of manufacturing a multilayer ceramic capacitor of FIGS. 13A through 15E.
Figure 16B:
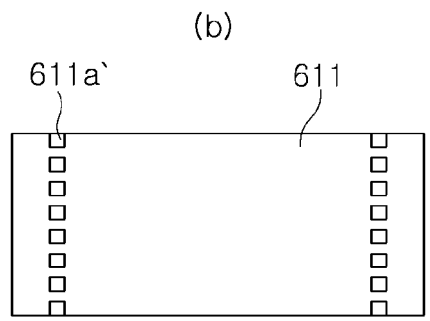
Figure 16C:
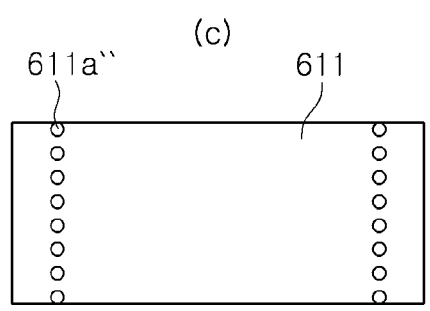

FIGS. 16A through 16C are plan views schematically illustrating various cross-sectional shapes of grooves in the methods of manufacturing a multilayer ceramic capacitor of FIGS. 13A through 15E.

Referring to FIGS. 16A through 16C, grooves may be formed as single gaps (See FIG. 16A), as quadrangular, disconnected gaps (See FIG. 16B), or as circular, disconnected gaps (See FIG. 16C).

Since shapes of the crack inducing air gaps are determined depending on shapes of the grooves, the shapes of the grooves may be changed to be appropriate therefor as necessary.

FIGS. 17A through 17E are views schematically illustrating another method of forming crack inducing air gaps in a method of manufacturing a multilayer ceramic capacitor according to an exemplary embodiment of the present disclosure.

Referring to FIGS. 17A through 17E, a method of forming crack inducing air gaps in a method of manufacturing a multilayer ceramic capacitor may include preparing a plurality of dielectric layers 611 and 616; forming grooves 611a and 616a in the plurality of dielectric layers 611 and 616, respectively, in order to form the crack inducing air gaps; and stacking and compressing the plurality of dielectric layers 611 and 616 having the grooves 611a and 616a formed therein, respectively, to prepare a ceramic multilayer body 612.

In the forming of the grooves, an interval between the grooves formed in an upper portion of the ceramic multilayer body may be wider than an interval between the grooves formed in a lower portion of the ceramic multilayer body in order to induce cracks to propagate to end surfaces of the ceramic multilayer body.

The multilayer ceramic capacitors according to exemplary embodiments of the present disclosure may include the dielectric layers in which the crack inducing air gaps are formed to induce cracks to propagate in a certain direction.

Therefore, cracks occurring in the multilayer ceramic capacitor may be induced so that it propagates in a direction to prevent the occurrence of short circuits, thereby improving reliability of the multilayer ceramic capacitor.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
a capacitance forming layer including dielectric layers and internal electrodes disposed on the dielectric layers;
a lower cover layer disposed below the capacitance forming layer;
an upper cover layer disposed above the capacitance forming layer; and
a plurality of crack inducing air gaps disposed in the lower cover layer,
wherein the crack inducing air gaps are disposed to be tapered from the capacitance forming layer to a lower surface of the lower cover layer.

2. The multilayer ceramic capacitor of claim 1, wherein a thickness of the lower cover layer is thicker than that of the upper cover layer.

3. The multilayer ceramic capacitor of claim 1, further comprising external electrodes covering portions of the lower cover layer and the capacitance forming layer and electrically connected to the internal electrodes,
wherein the crack inducing air gaps are disposed to be tapered from the capacitance forming layer to edge portions of the external electrodes formed extendedly on the lower cover layer.

4. The multilayer ceramic capacitor of claim 1, wherein the crack inducing air gaps are disposed to induce cracks occurring due to impacts to propagate to end surfaces of the lower cover layers.

5. The multilayer ceramic capacitor of claim 1, wherein the crack inducing air gaps are disposed as a plurality thereof in a linear manner or linearly as a plurality thereof in a disconnected manner in the lower cover layer.

6. A multilayer ceramic capacitor comprising:
first dielectric layers on which a first internal electrode is disposed;
second dielectric layers on which a second internal electrode is disposed;
a ceramic body in which the first and second dielectric layers are alternately stacked;
first crack inducing air gaps formed to be spaced apart from the first internal electrodes and in the first dielectric layers, respectively; and
second crack inducing air gaps formed to be spaced apart from the second internal electrodes and in the second dielectric layers, respectively.

7. The multilayer ceramic capacitor of claim 6, wherein the first crack inducing air gaps are disposed to induce cracks occurring due to impacts to propagate in a direction in which the cracks propagate so as to be spaced apart from the first internal electrodes.

8. The multilayer ceramic capacitor of claim 6, wherein the second crack inducing air gaps are disposed to induce cracks occurring due to impacts to propagate in a direction in which the cracks propagate so as to be spaced apart from the second internal electrodes.

9. The multilayer ceramic capacitor of claim 6, further comprising:
a first external electrode disposed on an end surface of the ceramic body and electrically connected to the first internal electrodes; and
a second external electrode disposed on a surface of the ceramic body opposing the surface on which the first external electrode is disposed, and electrically connected to the second internal electrodes,
wherein the first crack inducing air gaps are disposed to induce cracks propagating from the second external electrode to propagate in a direction in which the cracks propagate so as to be spaced apart from the first internal electrodes.

10. The multilayer ceramic capacitor of claim 6, further comprising:
a first external electrode disposed on an end surface of the ceramic body and electrically connected to the first internal electrodes; and
a second external electrode disposed on a surface of the ceramic body opposing the surface on which the first external electrode is disposed, and electrically connected to the second internal electrodes,
wherein the second crack inducing air gaps are disposed to induce cracks propagating from the first external electrode in a direction in which the cracks propagate so as to be spaced apart from the second internal electrodes.

11. The multilayer ceramic capacitor of claim 6, wherein the first crack inducing air gaps are disposed as a plurality thereof in a linear manner or linearly as a plurality thereof in a disconnected manner in the first dielectric layers, and
the second crack inducing air gaps are disposed as a plurality thereof in a linear manner or linearly as a plurality thereof in a disconnected manner in the second dielectric layers.

12. The multilayer ceramic capacitor of claim 6, wherein the first and second crack inducing air gaps are extended outwardly from a capacitance forming layer including the first and second internal electrodes and the first and second dielectric layers to a bottom surface of the ceramic body through a lower cover layer disposed below the capacitance forming layer.

13. A multilayer ceramic capacitor comprising:
first dielectric layers on which first and second internal electrodes are disposed;
second dielectric layers on which a float electrode is formed, the float electrodes being overlapped with portions of the first and second internal electrodes, respectively; and
crack inducing air gaps formed to be spaced apart from the first and second internal electrodes and in the first dielectric layers, respectively.

14. The multilayer ceramic capacitor of claim 13, wherein the crack inducing air gaps are disposed to induce cracks passing through the float electrodes to be spaced apart from the first and second internal electrodes.

15. The multilayer ceramic capacitor of claim 13, wherein the crack inducing air gaps are disposed as a plurality thereof in a linear manner or linearly as a plurality thereof in a disconnected manner in the first dielectric layers.

16. The multilayer ceramic capacitor of claim 13, wherein the crack inducing air gaps are extended outwardly from a capacitance forming layer including the first and second internal electrodes, the float electrodes, and the first and second dielectric layers, to a bottom surface of a ceramic body, through a lower cover layer disposed below the capacitance forming layer.

* * * * *